(12) United States Patent
Jones et al.

(10) Patent No.: US 10,232,867 B1
(45) Date of Patent: Mar. 19, 2019

(54) MULTI-FUNCTIONAL VEHICLE CADDY AND ASSOCIATED USE THEREOF

(71) Applicants: Carey Jones, Hemet, CA (US); Clifton Jones, Torrance, CA (US)

(72) Inventors: Carey Jones, Hemet, CA (US); Clifton Jones, Torrance, CA (US)

( * ) Notice: Subject to any disclaimer, the term of this patent is extended or adjusted under 35 U.S.C. 154(b) by 0 days.

(21) Appl. No.: 15/629,735

(22) Filed: Jun. 21, 2017

Related U.S. Application Data

(60) Provisional application No. 62/352,879, filed on Jun. 21, 2016.

(51) Int. Cl.
| | |
|---|---|
| *B62B 3/02* | (2006.01) |
| *B62B 3/14* | (2006.01) |
| *B62B 5/00* | (2006.01) |
| *B62B 5/04* | (2006.01) |

(52) U.S. Cl.
CPC ............. *B62B 3/022* (2013.01); *B62B 3/027* (2013.01); *B62B 3/1404* (2013.01); *B62B 5/0003* (2013.01); *B62B 5/0485* (2013.01)

(58) Field of Classification Search
CPC ....... B62B 3/022; B62B 3/027; B62B 3/1404; B62B 5/0003; B62B 5/0485; B62B 2205/005; B62B 2206/003
See application file for complete search history.

(56) References Cited

U.S. PATENT DOCUMENTS

| | | | | |
|---|---|---|---|---|
| 2,094,401 A | * | 9/1937 | Girl | B60R 5/04 224/42.32 |
| 2,531,856 A | * | 11/1950 | Marcouiller | B62B 3/022 248/168 |
| 2,953,287 A | * | 9/1960 | Werner | B60R 5/04 224/42.32 |
| 3,627,158 A | * | 12/1971 | Kobasic | B60R 5/04 414/462 |
| 4,753,567 A | * | 6/1988 | Achee, Sr. | A61G 3/0209 224/542 |
| 4,887,526 A | * | 12/1989 | Blatt | B60N 3/001 108/44 |
| 5,301,992 A | * | 4/1994 | Whitmore | B60R 5/04 224/542 |
| 5,569,013 A | * | 10/1996 | Evans | B62B 3/0625 254/10 R |
| 5,649,718 A | * | 7/1997 | Groglio | B62B 5/0003 280/43.17 |
| 6,709,038 B2 | * | 3/2004 | Bienert | B60R 5/04 296/26.1 |

(Continued)

FOREIGN PATENT DOCUMENTS

| | | | | |
|---|---|---|---|---|
| DE | 102005049421 A1 | * | 4/2006 | ............. B62B 3/027 |
| DE | 102008031541 A1 | * | 1/2010 | ............. B62B 3/027 |

(Continued)

*Primary Examiner* — James A Shriver, II
*Assistant Examiner* — Steve Clemmons

(57) ABSTRACT

A multi-functional transport apparatus includes an adjustable ramp capable of being positioned within the existing trunk of the existing motor vehicle, and a collapsible cart selectively positioned on the adjustable ramp. Advantageously, the collapsible cart is at a folded position when positioned on the adjustable ramp. Such a collapsible cart is deployed to an unfolded position when displaced off the adjustable ramp. Notably, the collapsible cart is selectively tilted between a plurality of inclined positions while seated on the adjustable ramp.

8 Claims, 9 Drawing Sheets

(56) References Cited

U.S. PATENT DOCUMENTS

| | | | | |
|---|---|---|---|---|
| 6,976,696 B2* | 12/2005 | O'Krangley | ......... | A61G 1/0562 280/638 |
| 7,229,093 B1* | 6/2007 | Carter | ...................... | B62B 3/022 280/641 |
| 7,670,097 B2* | 3/2010 | Horton | ...................... | B60R 5/04 414/462 |
| 7,992,912 B2* | 8/2011 | Klotz | ........................ | B60R 5/04 296/26.09 |
| 8,844,949 B2* | 9/2014 | White | ...................... | B62B 5/067 280/38 |
| 9,126,610 B1* | 9/2015 | Abiri | ................... | B62B 5/0003 |
| 9,399,476 B1* | 7/2016 | Stankevitz | ............ | B62B 5/0003 |
| 9,415,503 B1* | 8/2016 | Ferragonio | .............. | B25H 1/04 |
| 2005/0140119 A1* | 6/2005 | Wong | ...................... | B62B 3/027 280/651 |
| 2008/0061531 A1* | 3/2008 | Nugent | ................... | B62B 3/027 280/638 |
| 2008/0303248 A1* | 12/2008 | Chaparro | ................ | B62B 3/027 280/651 |
| 2011/0304125 A1* | 12/2011 | Ravnborg | ............... | B62B 3/027 280/651 |
| 2014/0140797 A1* | 5/2014 | Howe | ..................... | B62B 3/027 414/498 |
| 2017/0088154 A1* | 3/2017 | Lin | ........................ | B62B 3/027 |
| 2017/0355389 A1* | 12/2017 | Stewart | ................. | B62B 5/0003 |

FOREIGN PATENT DOCUMENTS

| | | | | |
|---|---|---|---|---|
| DE | 102010022452 A1 | * | 12/2011 | ............. B62B 3/027 |
| EP | 1733947 A2 | * | 12/2006 | ............. B62B 3/027 |
| FR | 2850623 A1 | * | 8/2004 | ............. B62B 3/027 |
| WO | WO-2017037702 A1 | * | 3/2017 | ........... B62B 5/0003 |

* cited by examiner

MULTI-FUNCTIONAL VEHICLE CADDY AND ASSOCIATED USE THEREOF

CROSS REFERENCE TO RELATED APPLICATIONS

This is a non-provisional patent application that claims the benefit of U.S. provisional patent application No. 62/352,879 filed Jun. 21, 2016, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to portable carts and, more particularly, to a multi-functional transport apparatus that includes a handy, sturdy, wheeled cargo-cart designed to serve not only as a personal shopping and utility cart, but also to serve as a container within the trunk or cargo compartment of a motor vehicle, and as a cart for transporting goods from car to home, thereby facilitating transport all of their goods from the car to the dwelling, in a single trip, within their own personal, clean, shopping and transport caddy.

Prior Art

There are more than 250 million cars, vans, SUVs, and pickups in use on the roads and highways of America. These vehicles are used to transport not only people, but property. And while we have seat-belts and shoulder-harnesses to protect ourselves as drivers and passengers, we have nothing analogous to protect and immobilize our property: our cargo. Even more importantly, once we arrive at home with whatever we're transporting—groceries or other purchases, clothes from the cleaners, sporting-goods and recreational gear, etc.—we have no convenient way to carry this cargo from car to home. The disclosure to be presented and considered herein would solve both problems: stabilizing cargo in the trunk or cargo compartment of our vehicles; enabling us to easily transport cargo from car to home; and even serving as a shopping and utility cart ideal for use in store, laundromat, and other locations.

Accordingly, a need remains for a multi-functional transport apparatus in order to overcome at least one aforementioned shortcoming. The exemplary embodiment(s) satisfy such a need by providing a handy, sturdy, wheeled cargo-cart designed to serve not only as a personal shopping and utility cart, but also to serve as a container within the trunk or cargo compartment of a motor vehicle, and as a cart for transporting goods from car to home that is convenient and easy to use, lightweight yet durable in design, versatile in its applications, and designed for facilitating transport all of their goods from the car to the dwelling, in a single trip, within their own personal, clean, shopping and transport caddy.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a multi-functional transport apparatus for being stored and retrieved from an existing trunk or existing cargo compartment of an existing motor vehicle and for transporting goods from the existing motor vehicle to a remote location. These and other objects, features, and advantages of the non-limiting exemplary embodiment(s) are provided by a multi-functional transport apparatus including an adjustable ramp capable of being positioned within the existing trunk of the existing motor vehicle, and a collapsible cart selectively positioned on the adjustable ramp. Advantageously, the collapsible cart is at a folded position when positioned on the adjustable ramp. Such a collapsible cart is deployed to an unfolded position when displaced off the adjustable ramp. Notably, the collapsible cart is selectively tilted between a plurality of inclined positions while seated on the adjustable ramp.

In a non-limiting exemplary embodiment, the collapsible cart includes a container having a centrally registered longitudinal axis, a plurality of support leg sections pivotally connected to the container, and a plurality of wheels connected to the support leg sections, respectively. In this manner, when the collapsible cart is at the unfolded position, each of the support leg sections is articulated to a generally vertical orientation. Conversely, when the collapsible cart is at the folded position, each of the support leg sections is articulated to a horizontal orientation aligned parallel to the centrally registered longitudinal axis.

In a non-limiting exemplary embodiment, the support leg sections include a first support leg section, a second support leg section, a third support leg section and a fourth support leg section, each operably coupled to a bottom surface of the container. Advantageously, the first support leg section and the second support leg section are positioned medially, relative to the third support leg section and the fourth support leg section, towards the centrally registered longitudinal axis. Notably, the first support leg section and the second support leg section are operably attached to a proximal end of the container, and the third support leg section and the fourth support leg section are operably attached to a distal end of the container.

In a non-limiting exemplary embodiment, each of the first support leg section, the second support leg section, the third support leg section and the fourth support leg section includes a primary anchor bracket statically mated to the bottom surface of the container, and a secondary anchor bracket spaced from the primary anchor bracket. Such a secondary anchor bracket is engaged with the bottom surface of the container and oriented parallel to the centrally registered longitudinal axis.

In a non-limiting exemplary embodiment, each of the first support leg section, the second support leg section, the third support leg section and the fourth support leg section further includes a support leg including a proximal end pivotally coupled to the primary anchor bracket and a distal end operably attached to a corresponding one of the wheels, a primary support arm having a proximal end and an axially opposed distal end, and a secondary support arm having a proximal end and an axially opposed distal end. Advantageously, the proximal end of the primary support arm is pivotally connected to the proximal end of the support leg. In this manner, the distal end of the primary support arm is pivotally connected to the distal end of the secondary support arm. Notably, the proximal end of the secondary support arm is pivotally connected to a distal end of the secondary anchor bracket.

In a non-limiting exemplary embodiment, each of the first support leg section, the second support leg section, the third support leg section and the fourth support leg section further includes a piston including a first end coupled to a proximal end of the secondary anchor bracket, and a second end coupled to the distal end of the primary support arm and the distal end of the secondary support arm.

In a non-limiting exemplary embodiment, at least one accessory selected from a group including a handle fixedly attached to a proximal end of the container, a retractable cover housed at the proximal end of the container and being selectively extended along a top opening of the container, a plurality of brakes operably engaged with the wheels, respectively, and a divider removably positioned within the container.

In a non-limiting exemplary embodiment, the adjustable ramp includes a plurality of lower rails orientated parallel to the centrally registered horizontal axis, a plurality of upper rails, and at least one telescopic support shaft attached to the lower rails and the upper rails. Advantageously, the upper rails include a first end pivotally connected to the lower rails, and a second end attached to the at least one telescopic support shaft such that the second end is selectively raised above the lower rails as needed.

In a non-limiting exemplary embodiment, the adjustable ramp further includes a first flange member attached to the lower rails and the upper rails, and a second flange member opposed to the first flange member. Advantageously, such a second flange member is attached to the upper rails and spaced above the lower rails.

The present disclosure further includes a method of utilizing a multi-functional transport apparatus for being stored and retrieved from an existing trunk or existing cargo compartment of an existing motor vehicle and for transporting goods from the existing motor vehicle to a remote location. Such a method includes the steps of: providing an adjustable ramp and an existing motor vehicle having an existing trunk; positioning the adjustable ramp within the existing trunk of the existing motor vehicle; selectively positioning the collapsible cart on the adjustable ramp such that the collapsible cart is at a folded position when positioned on the adjustable ramp; displacing the collapsible cart off the adjustable ramp and thereby deploying the collapsible cart to an unfolded position; and selectively tilting the collapsible cart between a plurality of inclined positions while seated on the adjustable ramp.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
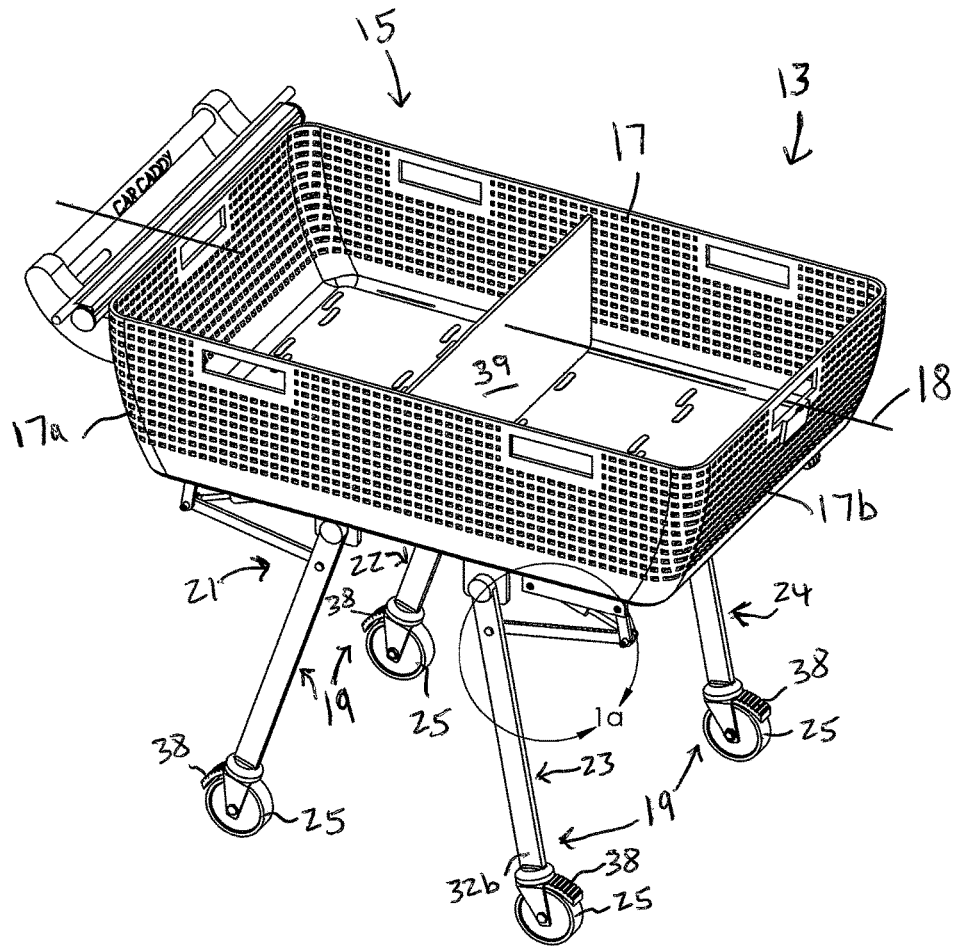
FIG. 1 is a perspective view of a collapsible cart at a deployed, unfolded position, in accordance with a non-limiting exemplary embodiment of at a multi-functional transport apparatus.
Figure 1A:
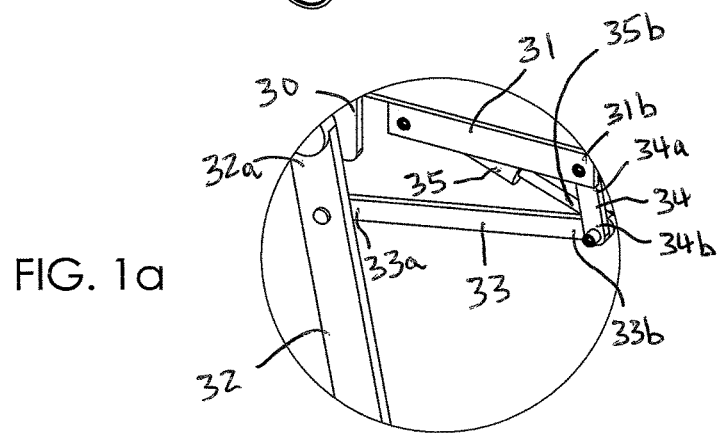
FIG. 1a is an enlarged view of section 1a taken in FIG. 1.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about" means approximately or nearly and in the context of a numerical value or range set forth means±15% of the numerical.

If used herein, "substantially" means largely if not wholly that which is specified but so close that the difference is insignificant.

Figure 2:
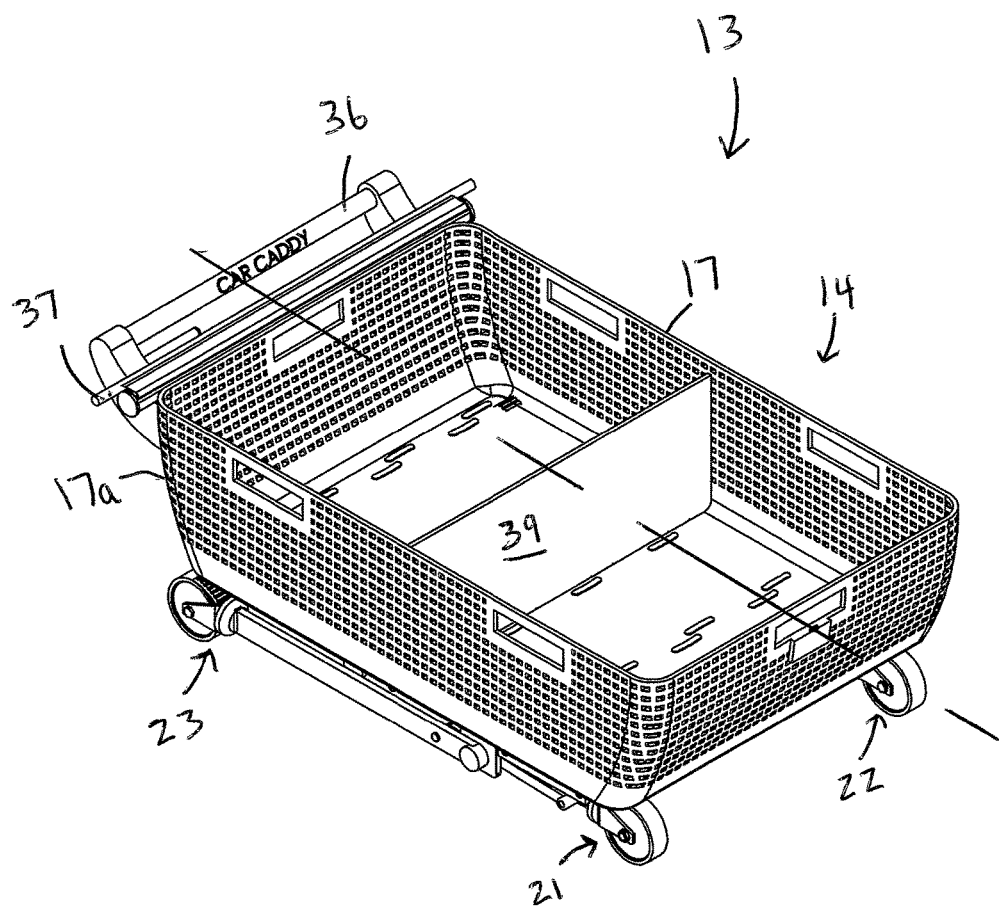
FIG. 2 is a perspective view showing the cart of FIG. 1 at a stored, folded position.
Figure 3:
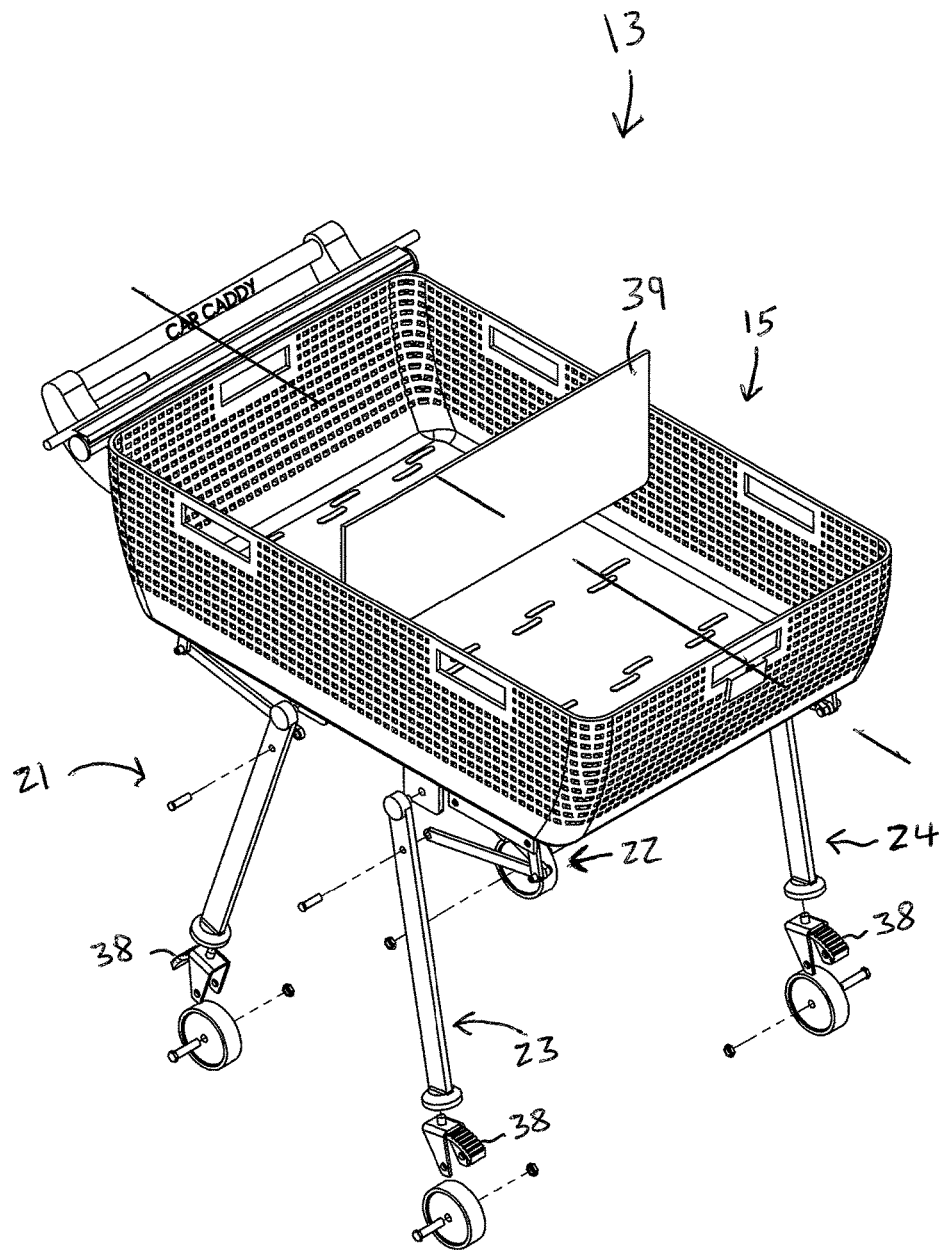
FIG. 3 is an exploded view of the collapsible cart shown in FIG. 1.
Figure 4:
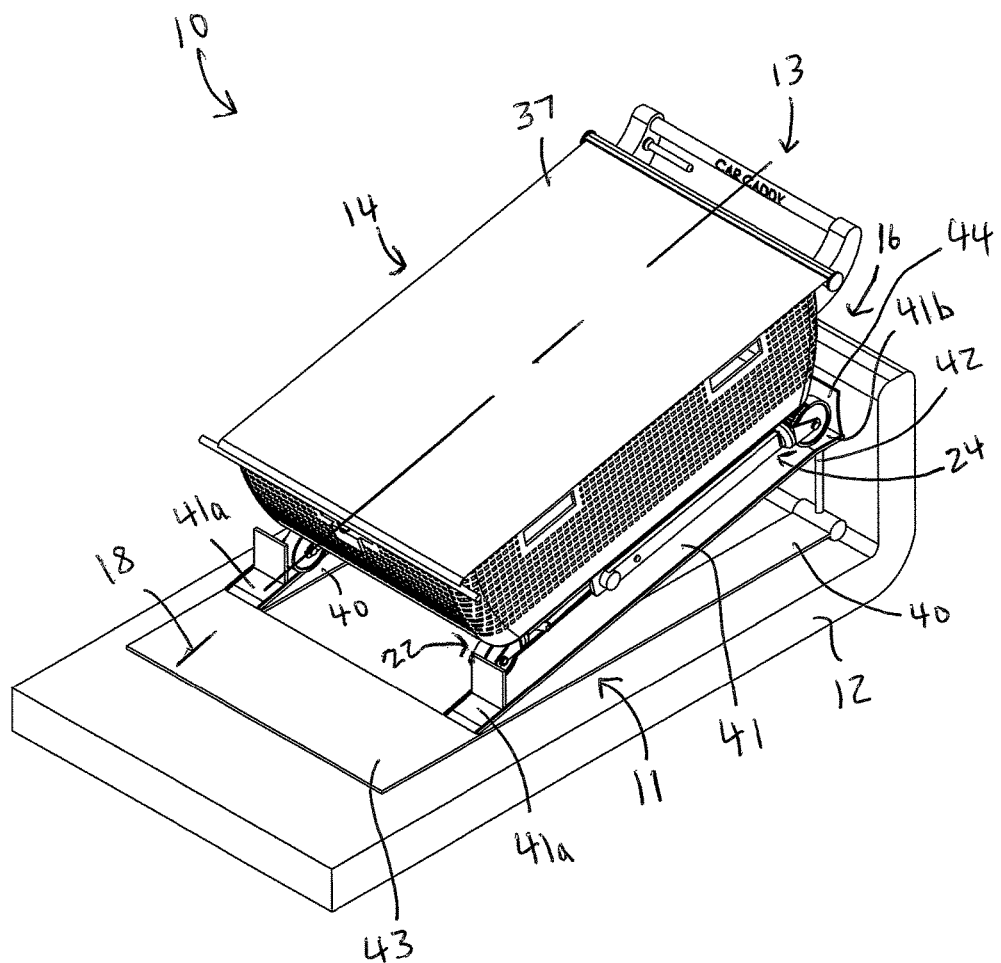
FIG. 4 is a perspective view of a multi-functional transport apparatus including a collapsible cart seated at an inclined position on an adjustable ramp.
Figure 5:
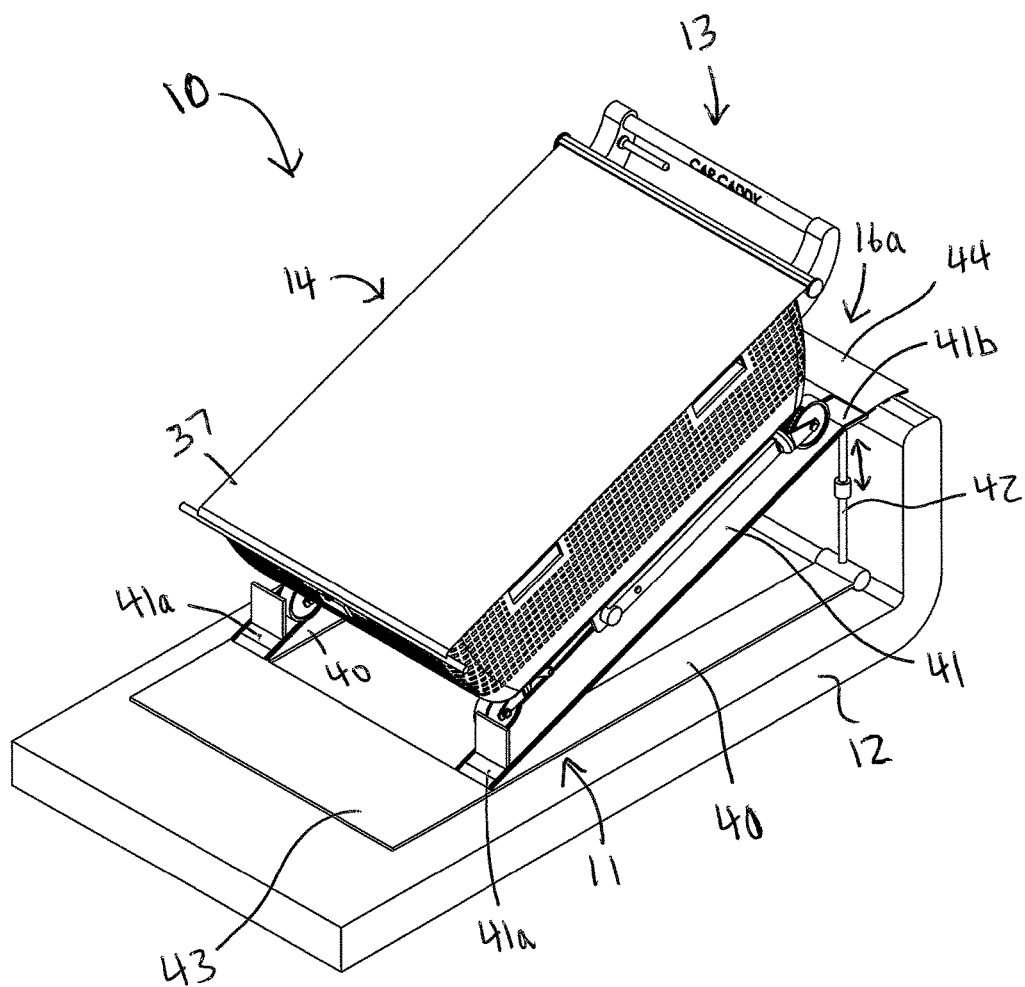
FIG. 5 is a perspective view of the collapsible cart in FIG. 4 seated at an alternate inclined position on the adjustable ramp.
Figure 6:
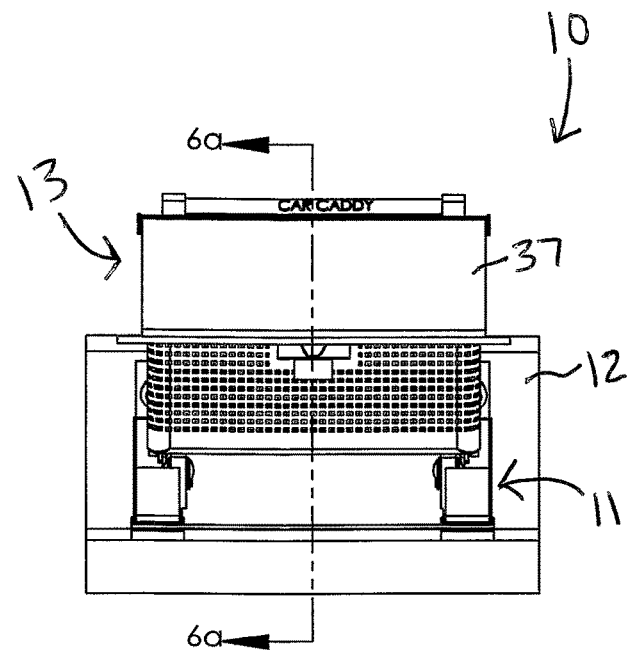
FIG. 6 is a front elevational view of the multi-functional transport apparatus shown in FIG. 4.
Figure 6A:
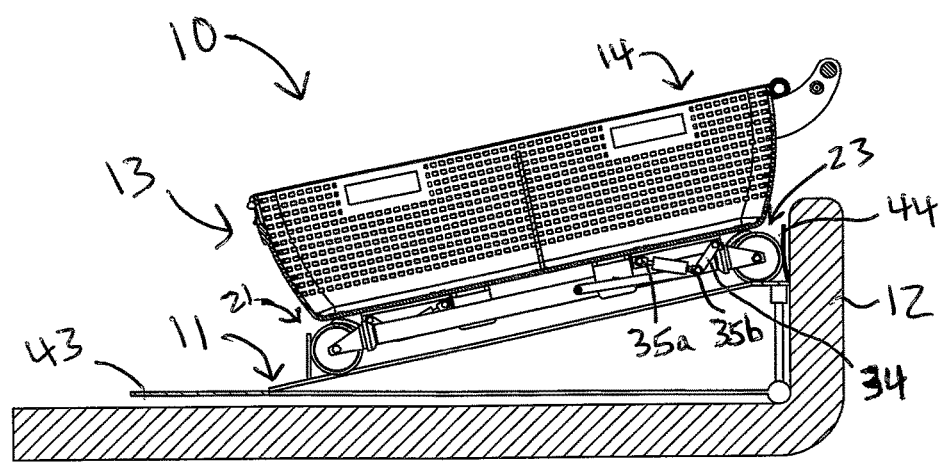
FIG. 6a is a cross-sectional view taken along line 6a-6a in FIG. 6.
Figure 7:
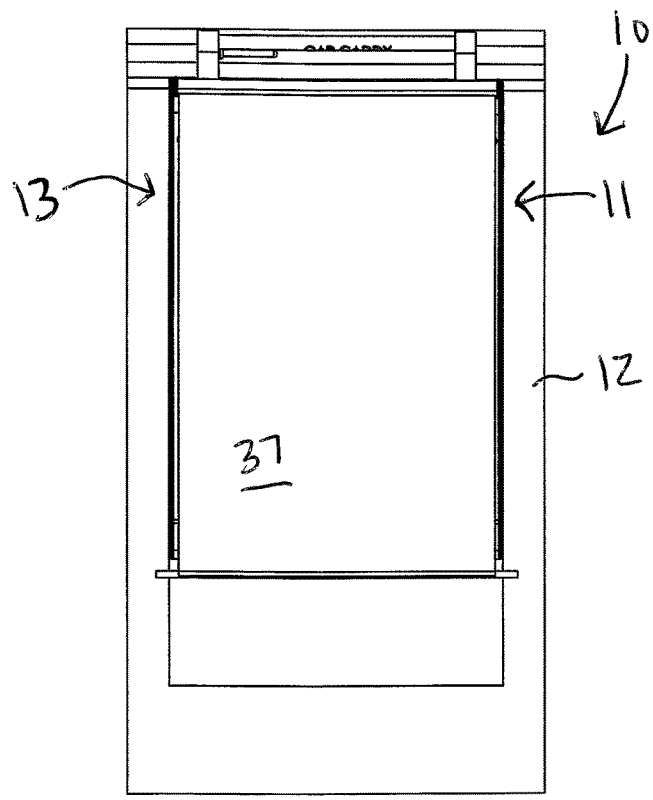
FIG. 7 is a top plan view of the multi-functional transport apparatus shown in FIG. 4.
Figure 8:
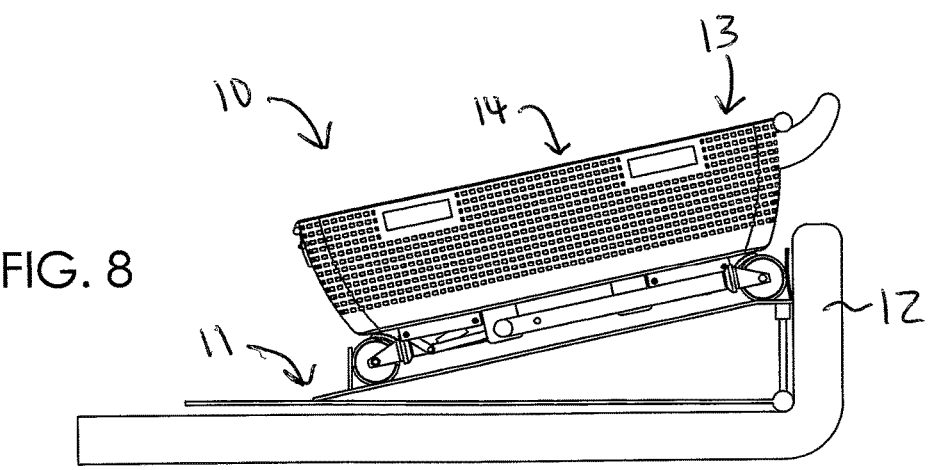
FIG. 8 is a side elevational view of the multi-functional transport apparatus shown in FIG. 4.
Figure 9:
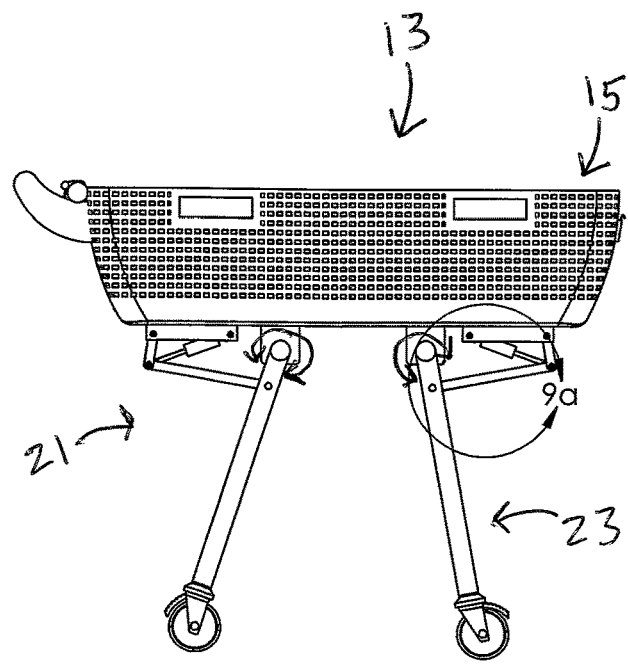
FIG. 9 is a side elevational of the collapsible cart at the deployed, unfolded position.
Figure 9A:
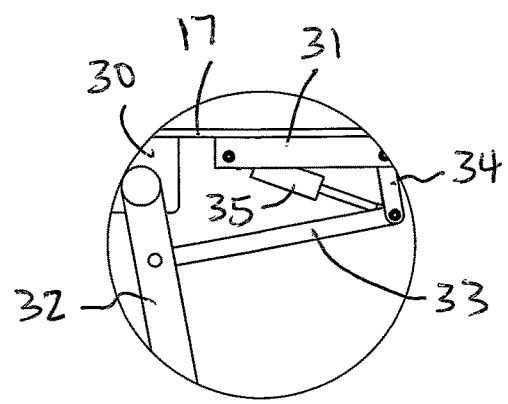
FIG. 9a is an enlarged view of section 9a taken in FIG. 9.
Figure 10:
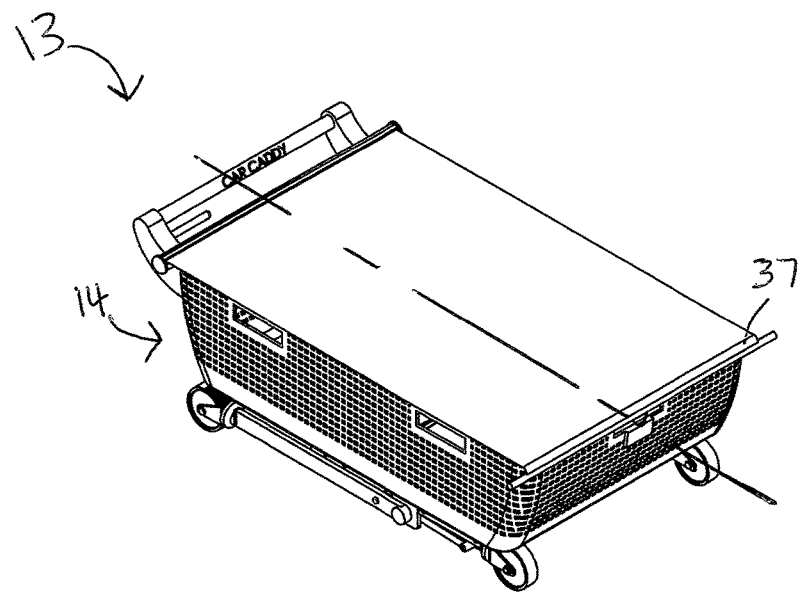
FIG. 10 is a perspective view showing the cover extracted over a top of the container.
Figure 11:
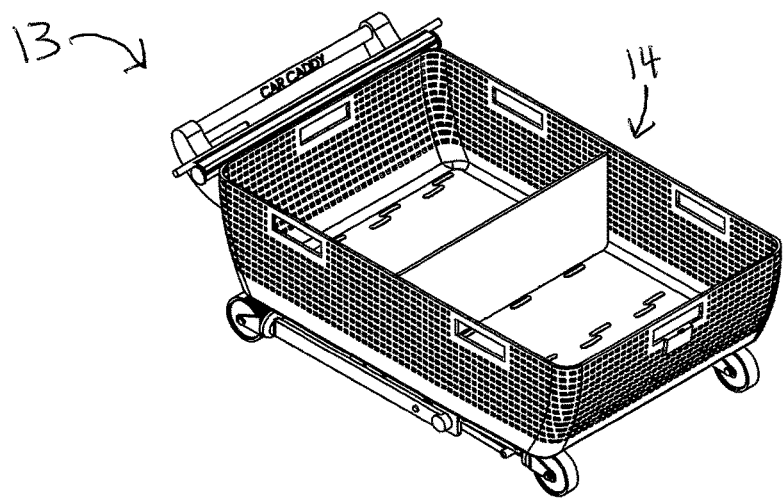
FIG. 11 is a perspective view showing the cover retracted into its housing.

The non-limiting exemplary embodiment(s) is/are referred to generally in FIGS. 1-11 and is/are intended to provide a multi-functional transport apparatus 10, which includes a handy, sturdy, wheeled cargo-cart 13 designed to serve not only as a personal shopping and utility cart, but also to serve as a container within the trunk 12 or cargo compartment of a motor vehicle, and as a cart for transporting goods from car to home, thereby facilitating transport all of a user's goods from the motor vehicle to the dwelling, in a single trip, within the user's clean, shopping and transport caddy. It should be understood that the exemplary embodiment(s) may be used to store and transport a variety of objects, and should not be limited to any particular objects described herein.

The multi-functional transport apparatus 10 is designed to perform three essential functions: serving as a shopping and utility cart 13; a secure receptacle during vehicular transport of goods; and a convenient, one-trip mechanism of getting goods from a car to a dwelling. In terms of operation, the self-extending, wheeled legs automatically extend for wheeled use; and automatically retract for storage or vehicular transport. Advantageously, the multi-functional transport apparatus 10 employs at least one of: scissor legs, pneumatic legs and hydraulic legs (similar to those of a hospital gurney) that allows the user to place the collapsible cart 13 in a trunk or cargo compartment of a motor vehicle.

Referring to generally to FIGS. 1-11, the multi-functional transport apparatus 10 includes an adjustable ramp 11 capable of being positioned within the existing trunk 12 of the existing motor vehicle, and a collapsible cart 13 selectively positioned on the adjustable ramp 11. Advantageously, the collapsible cart 13 is at a folded position 14 when positioned on the adjustable ramp 11. Such a collapsible cart 13 is deployed to an unfolded position 15 when displaced off the adjustable ramp 11. Notably, the collapsible cart 13 is selectively tilted between a plurality of inclined positions 16, 16a (e.g., FIGS. 4 and 5) while seated on the adjustable ramp 11.

In a non-limiting exemplary embodiment, the collapsible cart 13 includes a container 17 having a centrally registered longitudinal axis 18, a plurality of support leg sections 19 pivotally connected to the container 17, and a plurality of wheels 25 connected to the support leg sections 19, respectively. In this manner, when the collapsible cart 13 is at the unfolded position 15, each of the support leg sections 19 is articulated to a generally vertical orientation (relative to the horizontal orientation of cart 13). Conversely, when the collapsible cart 13 is at the folded position 14, each of the support leg sections 19 is articulated to a horizontal orientation aligned parallel to the centrally registered longitudinal axis 18.

In a non-limiting exemplary embodiment, the support leg sections 19 include a first support leg section 21, a second support leg section 22, a third support leg section 23 and a fourth support leg section 24, each operably coupled to a bottom surface of the container 17. Advantageously, the first support leg section 21 and the second support leg section 22 are positioned medially, relative to the third support leg section 23 and the fourth support leg section 24, towards the centrally registered longitudinal axis 18. Notably, the first support leg section 21 and the second support leg section 22 are operably attached to a proximal end 17a of the container 17, and the third support leg section 23 and the fourth support leg section 24 are operably attached to a distal end 17b of the container 17.

To avoid unnecessary redundancy, it is understood that each support leg sections 19 include the same structural components described hereinbelow.

In a non-limiting exemplary embodiment, each of the first support leg section 21, the second support leg section 22, the third support leg section 23 and the fourth support leg section 24 includes a primary anchor bracket 30 statically mated to the bottom surface of the container 17, and a secondary anchor bracket 31 spaced from the primary anchor bracket 30. Such a secondary anchor bracket 31 is engaged with the bottom surface of the container 17 and oriented parallel to the centrally registered longitudinal axis 18.

In a non-limiting exemplary embodiment, each of the first support leg section 21, the second support leg section 22, the third support leg section 23 and the fourth support leg section 24 further includes a support leg 32 including a proximal end 32a pivotally coupled to the primary anchor bracket 30 and a distal end 32b operably attached to a corresponding one of the wheels 25, a primary support arm 33 having a proximal end 33a and an axially opposed distal end 33b, and a secondary support arm 34 having a proximal end 34a and an axially opposed distal end 34b. Advantageously, the proximal end 33a of the primary support arm 33 is pivotally connected to the proximal end 32a of the support leg 32. In this manner, the distal end 33b of the primary support arm 33 is pivotally connected to the distal end 34b of the secondary support arm 34. Notably, the proximal end 34a of the secondary support arm 34 is pivotally connected to a distal end 31b of the secondary anchor bracket 31.

In a non-limiting exemplary embodiment, each of the first support leg section 21, the second support leg section 22, the third support leg section 23 and the fourth support leg section 24 further includes a piston 35 including a first end 35a coupled to a proximal end 31a of the secondary anchor bracket 31, and a second end 35b coupled to the distal end 33b of the primary support arm 33 and the distal end 34b of the secondary support arm 34.

In a non-limiting exemplary embodiment, at least one accessory selected from a group including a handle 36 fixedly attached to a proximal end 17a of the container 17, a retractable cover 37 housed at the proximal end 17a of the container 17 and being selectively extended along a top opening of the container 17, a plurality of brakes 38 operably engaged with the wheels 25, respectively, and a divider 39 removably positioned within the container 17.

In a non-limiting exemplary embodiment, the cover 37 may be a cloth or flexible lid that can be hidden and lifted-out of the inside of a housing to protect the contents inside of the collapsible cart 13. Alternately, the lid or cover 37 may be attached to each side of the handle 36, which can be flipped up-and-over the container 17 to shield and protect contents inside of the container 17.

In a non-limiting exemplary embodiment, the adjustable ramp 11 includes a plurality of lower rails 40 orientated parallel to the centrally registered horizontal axis 18, a plurality of upper rails 41, and at least one telescopic support shaft 42 attached to the lower rails 40 and the upper rails 41. Advantageously, the upper rails 41 include a first end 41a pivotally connected to the lower rails 40, and a second end 41b attached to the at least one telescopic support shaft 42 such that the second end 41b is selectively raised above the lower rails 40, as needed.

In a non-limiting exemplary embodiment, the adjustable ramp 11 further includes a first flange 43 member attached to the lower rails 40 and the upper rails 41, and a second flange 44 member opposed to the first flange 43 member. Advantageously, such a second flange 44 member is attached to the upper rails 41 and spaced above the lower rails 40 for assisting a user to ingress and egress collapsible cart 13 from the vehicle trunk.

The present disclosure further includes a method of utilizing a multi-functional transport apparatus 10 for being stored and retrieved from an existing trunk 12 or existing cargo compartment of an existing motor vehicle and for transporting goods from the existing motor vehicle to a remote location. Such a method includes the steps of: providing an adjustable ramp 11 and an existing motor vehicle having an existing trunk 12; positioning the adjustable ramp 11 within the existing trunk 12 of the existing motor vehicle; selectively positioning the collapsible cart 13 on the adjustable ramp 11 such that the collapsible cart 13 is at a folded position 14 when positioned on the adjustable ramp 11; displacing the collapsible cart 13 off the adjustable ramp 11 and thereby deploying the collapsible cart 13 to an unfolded position 15; and selectively tilting the collapsible cart 13 between a plurality of inclined positions 16, 16a while seated on the adjustable ramp 11.

Referring to FIGS. 1-11 in general, in a non-limiting exemplary embodiment(s), a personal utility cart system 10, one specifically designed for use with a motor vehicle includes a collapsible shopping and utility cart 13, serving users in three ways: first, as a basket-like container 17 in the trunk 12 or cargo compartment of a vehicle; second, with its automatically-extending, drop-down legs and wheels 25—also serving as a personal shopping cart 13; and third, as a conveyance for easily and securely transporting goods from a vehicle to a dwelling.

The multi-functional transport apparatus 10 may be basket-like in configuration, with a rectangular, oval, or oblong profile in aerial view, and dimensions (when collapsed) of approximately 30 inches in length, 22 inches in width, and 25 inches in depth. The cart 13 may be fabricated in either a molded thermoplastic polymer or in aluminum or stainless steel, and the container may be equipped with a pull-handle 36 at the front, as well as two pairs of lift-handles on either side. The front pull-handle 36 also serves as a release-and-locking lever by means of which the scissor-style, pneumatic or hydraulic legs (like those of a hospital gurney) are released, collapsed, or locked in either position. The multi-functional transport apparatus 10 rides on four 360-degree, heavy-duty casters, and the basket will be fashioned with recesses into which the front casters nest when the legs are collapsed.

Further, the front bottom of the basket may be equipped with a rubber-coated pad to prevent slipping and sliding when the collapsible cart 13 is in the vehicle, while the rear casters remain beneath the basket (container), making it easy to roll the collapsible cart 13 into the trunk 12 or cargo compartment, and to reposition the collapsible cart 13 as desired. One or more of the casters may be equipped with tabular foot-brakes 38, and that the basket may be divided into two equal-capacity compartments. Also, the basket may be adjustable in height.

The multi-functional transport apparatus 10 provides a host of advantages and benefits and is designed to perform three essential functions serving: as a shopping and utility cart; as a secure receptacle during vehicular transport of goods; and as a convenient, one-trip mechanism of getting goods from car to home. Thus, shopping cart 13 is clean and free of the contamination and germs commonly found on store carts 13. As a vehicular receptacle, cart 13 keeps items organized, together, and protected from buffeting and movement in cargo compartment or trunk 12. And a one-trip cart 13 for getting goods into house, condo, or apartment for saving consumers time, trouble, multiple trips, and labor. In terms of operation, the self-extending, wheeled legs operate themselves, automatically extending for wheeled use, automatically retracting for storage or vehicular transport.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A multi-functional transport apparatus for being stored and retrieved from an existing trunk or existing cargo compartment of an existing motor vehicle and for transporting goods from the existing motor vehicle to a remote location, said multi-functional transport apparatus comprising:
an adjustable ramp capable of being positioned within the existing trunk of the existing motor vehicle; and
a collapsible cart selectively positioned on said adjustable ramp, wherein said collapsible cart is at a folded position when positioned on said adjustable ramp, said collapsible cart being deployed to an unfolded position when displaced off said adjustable ramp;
wherein said collapsible cart comprises:
a container having a centrally registered longitudinal axis;
a plurality of support leg sections pivotally connected to said container; and
a plurality of wheels connected to said support leg sections, respectively;
wherein, when said collapsible cart is at said unfolded position, each of said support leg sections is articulated to a generally vertical orientation;
wherein, when said collapsible cart is at said folded position, each of said support leg sections is articulated to a horizontal orientation aligned parallel to said centrally registered longitudinal axis;
wherein said support leg sections comprises:
a first support leg section, a second support leg section, a third support leg section and a fourth support leg section, each operably coupled to a bottom surface of said container;
wherein said first support leg section and said second support leg section are positioned medially, relative to said third support leg section and said fourth support leg section, towards the centrally registered longitudinal axis;
wherein said first support leg section and said second support leg section are operably attached to a proximal end of said container; and
wherein said third support leg section and said fourth support leg section are operably attached to a distal end of said container;
wherein each of said first support leg section, said second support leg section, said third support leg section and said fourth support leg section comprises:
a primary anchor bracket statically mated to said bottom surface of said container; and
a secondary anchor bracket spaced from said primary anchor bracket, said secondary anchor bracket being engaged with said bottom surface of said container and oriented parallel to said centrally registered longitudinal axis;
wherein each of said first support leg section, said second support leg section, said third support leg section and said fourth support leg section further comprises:
a support leg including
a proximal end pivotally coupled to said primary anchor bracket, and
a distal end operably attached to a corresponding one of said wheels;
a primary support arm having a proximal end and an axially opposed distal end; and
a secondary support arm having a proximal end and an axially opposed distal end;
wherein said proximal end of said primary support arm is pivotally connected to said proximal end of said support leg;
wherein said distal end of said primary support arm is pivotally connected to said distal end of said secondary support arm;
wherein said proximal end of said secondary support arm is pivotally connected to a distal end of said secondary anchor bracket;
wherein each of said first support leg section, said second support leg section, said third support leg section and said fourth support leg section further comprises: a piston including
a first end coupled to a proximal end of said secondary anchor bracket; and
a second end coupled to said distal end of said primary support arm and said distal end of said secondary support arm.

2. The multi-functional transport apparatus of claim 1, further comprising: at least one accessory selected from a group including:
a handle fixedly attached to a proximal end of said container;
a retractable cover housed at said proximal end of said container and being selectively extended along a top opening of said container;
a plurality of brakes operably engaged with said wheels, respectively; and
a divider removably positioned within said container.

3. The multi-functional transport apparatus of claim 1, wherein said adjustable ramp comprises:
a plurality of lower rails orientated parallel to the centrally registered horizontal axis;
a plurality of upper rails; and
at least one telescopic support shaft attached to said lower rails and said upper rails;
wherein said upper rails include
a first end pivotally connected to said lower rails, and
a second end attached to said at least one telescopic support shaft such that said second end is selectively raised above said lower rails as needed.

4. The multi-functional transport apparatus of claim 3, wherein said adjustable ramp further comprises:
a first flange member attached to said lower rails and said upper rails; and
a second flange member opposed to said first flange member, said second flange member being attached to said upper rails and spaced above said lower rails.

5. A multi-functional transport apparatus for being stored and retrieved from an existing trunk or existing cargo compartment of an existing motor vehicle and for transporting goods from the existing motor vehicle to a remote location, said multi-functional transport apparatus comprising:
- a collapsible cart selectively positioned in the existing trunk or existing cargo compartment of the existing motor vehicle, wherein said collapsible cart is at a folded position when positioned in the existing trunk or existing cargo compartment of the existing motor vehicle, said collapsible cart being deployed to an unfolded position when displaced out from the existing trunk or existing cargo compartment of the existing motor vehicle;
- wherein said collapsible cart is selectively tilted between a plurality of inclined positions while seated in the existing trunk or existing cargo compartment of the existing motor vehicle;
- wherein said collapsible cart comprises:
  - a container having a centrally registered longitudinal axis,
  - a plurality of support leg sections pivotally connected to said container, and
  - a plurality of wheels connected to said support leg sections, respectively;
- wherein, when said collapsible cart is at said unfolded position, each of said support leg sections is articulated to a generally vertical orientation;
- wherein, when said collapsible cart is at said folded position, each of said support leg sections is articulated to a horizontal orientation aligned parallel to said centrally registered longitudinal axis;
- wherein, when said collapsible cart is at said folded position, corresponding pairs of said support leg sections are disposed at an overlapped configuration such that corresponding pairs of said wheels are located at an opposite side of said collapsible cart relative to a location of said corresponding pairs of said wheels when said collapsible cart is at said unfolded position
- wherein said support leg sections comprises:
  - a first support leg section, a second support leg section, a third support leg section and a fourth support leg section, each operably coupled to a bottom surface of said container;
  - wherein said first support leg section and said second support leg section are positioned medially, relative to said third support leg section and said fourth support leg section, towards the centrally registered longitudinal axis;
  - wherein said first support leg section and said second support leg section are operably attached to a proximal end of said container; and
  - wherein said third support leg section and said fourth support leg section are operably attached to a distal end of said container;
- wherein each of said first support leg section, said second support leg section, said third support leg section and said fourth support leg section comprises:
  - a primary anchor bracket statically mated to said bottom surface of said container; and
  - a secondary anchor bracket spaced from said primary anchor bracket, said secondary anchor bracket being engaged with said bottom surface of said container and oriented parallel to said centrally registered longitudinal axis;
- wherein each of said first support leg section, said second support leg section, said third support leg section and said fourth support leg section further comprises:
  - a support leg including
    - a proximal end pivotally coupled to said primary anchor bracket, and
    - a distal end operably attached to a corresponding one of said wheels;
  - a primary support arm having a proximal end and an axially opposed distal end; and
  - a secondary support arm having a proximal end and an axially opposed distal end;
  - wherein said proximal end of said primary support arm is pivotally connected to said proximal end of said support leg;
  - wherein said distal end of said primary support arm is pivotally connected to said distal end of said secondary support arm;
  - wherein said proximal end of said secondary support arm is pivotally connected to a distal end of said secondary anchor bracket;
- wherein each of said first support leg section, said second support leg section, said third support leg section and said fourth support leg section further comprises: a piston including
  - a first end coupled to a proximal end of said secondary anchor bracket; and
  - a second end coupled to said distal end of said primary support arm and said distal end of said secondary support arm.

6. The multi-functional transport apparatus of claim 5, further comprising: at least one accessory selected from a group including:
- a handle fixedly attached to a proximal end of said container;
- a retractable cover housed at said proximal end of said container and being selectively extended along a top opening of said container;
- a plurality of brakes operably engaged with said wheels, respectively; and
- a divider removably positioned within said container.

7. The multi-functional transport apparatus of claim 5, further comprising: an adjustable ramp including
- a plurality of lower rails orientated parallel to the centrally registered horizontal axis;
- a plurality of upper rails; and
- at least one telescopic support shaft attached to said lower rails and said upper rails;
- wherein said upper rails include
  - a first end pivotally connected to said lower rails, and
  - a second end attached to said at least one telescopic support shaft such that said second end is selectively raised above said lower rails as needed.

8. The multi-functional transport apparatus of claim 7, wherein said adjustable ramp further comprises:
- a first flange member attached to said lower rails and said upper rails; and
- a second flange member opposed to said first flange member, said second flange member being attached to said upper rails and spaced above said lower rails.

* * * * *